United States Patent
Garramone

(10) Patent No.: US 9,978,164 B2
(45) Date of Patent: May 22, 2018

(54) ENHANCED VISUALIZATION METHOD FOR DOWN HOLE DIAGNOSTICS AND CHARACTERIZATION

(71) Applicant: Halliburton Energy Services, Inc., Houston, TX (US)

(72) Inventor: John J. Garramone, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days. days.

(21) Appl. No.: 15/287,377

(22) Filed: Oct. 6, 2016

(65) Prior Publication Data

US 2018/0101969 A1    Apr. 12, 2018

(51) Int. Cl.

| G06T 11/00 | (2006.01) |
| G06T 11/20 | (2006.01) |
| G06F 9/54  | (2006.01) |
| G06F 17/30 | (2006.01) |
| E02F 9/26  | (2006.01) |
| E02F 9/20  | (2006.01) |
| E21B 41/00 | (2006.01) |

(52) U.S. Cl.
CPC ........ *G06T 11/206* (2013.01); *E21B 41/0092* (2013.01); *G06T 11/001* (2013.01)

(58) Field of Classification Search
CPC combination set(s) only.
See application file for complete search history.

(56) References Cited

U.S. PATENT DOCUMENTS

| 7,089,266 | B2 | 8/2006 | Stolle et al. |
| 7,379,601 | B2 | 5/2008 | Yang et al. |
| 7,760,203 | B1 | 7/2010 | Hao et al. |
| 8,745,572 | B2* | 6/2014 | Zimmermann ..... G06F 11/3604 717/101 |
| 2003/0071814 | A1* | 4/2003 | Jou ........................ G06F 9/542 345/440 |
| 2007/0255321 | A1* | 11/2007 | Gerber ............... A61N 1/37247 607/2 |
| 2007/0255322 | A1* | 11/2007 | Gerber ............... A61N 1/37247 607/2 |
| 2010/0318512 | A1* | 12/2010 | Ludwig ............. G06F 17/30241 707/722 |
| 2011/0137566 | A1* | 6/2011 | Jacobson ............... G01V 5/101 702/8 |
| 2011/0148856 | A1* | 6/2011 | Sprock .................. E02F 9/2054 345/419 |
| 2012/0011474 | A1* | 1/2012 | Kashik ............. G06F 17/30554 715/848 |
| 2017/0337293 | A1* | 11/2017 | Farkash ........... G06F 17/30601 |

FOREIGN PATENT DOCUMENTS

EP    0567563 B1    11/1999

* cited by examiner

*Primary Examiner* — Wesner Sajous
(74) *Attorney, Agent, or Firm* — John Wustenberg; Parker Justiss, P.C.

(57) ABSTRACT

A method, a non-transient computer readable medium containing instruction, and a computing system are provided. In one embodiment, the method includes steps of: (1) identifying an area in a graph using first and second parameters of multiple parameters; (2) consolidating other parameters of the multiple parameters that are associated with the area into a single visualization value; and (3) visualizing the area according to the single visualization value.

16 Claims, 3 Drawing Sheets

ENHANCED VISUALIZATION METHOD FOR DOWN HOLE DIAGNOSTICS AND CHARACTERIZATION

BACKGROUND

Previously, visualizing multidimensional data such as a compositional profile of a producing well, required each parameter to inherit its own dimension. While conventional data analysis software, e.g. spreadsheet or database software, can visualize a relatively small number of parameters, e.g. three or four parameters, sophisticated parametric visualization software had to be used to visualize a large number of parameters.

BRIEF DESCRIPTION

Reference is now made to the following descriptions taken in conjunction with the accompanying drawings, in which.

DETAILED DESCRIPTION

As mentioned before, when it becomes virtually impossible to display all the required parameters in conventional data analysis software, sophisticated parametric rendering visualization software has been used. But the parametric visualization software is very expensive to license and more importantly very difficult to comprehend as it presents complex visualization. As such, a new visualization method is needed that can display multidimensional data without using the parametric rendering visualization software.

Introduced herein is a new method that can add more parameters to the visualization without adding dimensions for the added parameters. Instead of adding more dimensions to the visualization and requiring the use of $3^{rd}$ party parametric visualization software, the method uses a Color Value Algorithm (CVA) to consolidate multiple parameters into a single visualization value. By varying color appearance properties of the visualization value, e.g. hue, saturation, lightness, brightness, based on the consolidated parameters, multiple dimensions may be displayed by the single visualization value. As such, when the multiple parameters are consolidated and visualized as a single value in a graph, it will provide a quicker and easier way to view and analyze the data. One area of data analysis that may benefit from this new method and devices is the identification of injection and/or production zones using the combination of Distributed Temperature Sensing (DTS) and Distributed Acoustic Sensing (DAS) data.

Figure 1:
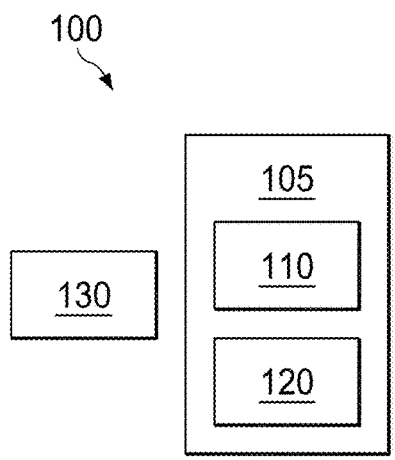
FIG. 1 illustrates a block diagram of an embodiment of a computing system for plotting multiple parameters of a well in a graph.

FIG. 1 illustrates a block diagram of one embodiment of a computing system 100 for plotting multiple parameters of a well in a graph. The term "graph" in the current disclosure is a diagram showing the relation between multiple variables, such as multiple parameters of a well, and includes other graphical diagrams such as a plot and a chart.

The computing system 100 includes a computer 105 having a memory 110 and a processor 120, and a display device or display 130. Although illustrated separately, the computer 105 and the display 130 may be combined together as a single unit such as an all-in-one desktop, a laptop, a tablet or other smart devices.

In the illustrated embodiment, the memory 110 is configured to store the multiple parameters of a well. The parameters include, but not limited to, the output composition data of the well, e.g. ratios of water, oil and gas in the output composition, the times of the output compositions, and location data of the well, e.g. the depth (from sea level), longitude, latitude of the well. It is understood that the stored parameters is not limited to the parameters of a single well but of multiple wells.

Figure 2:
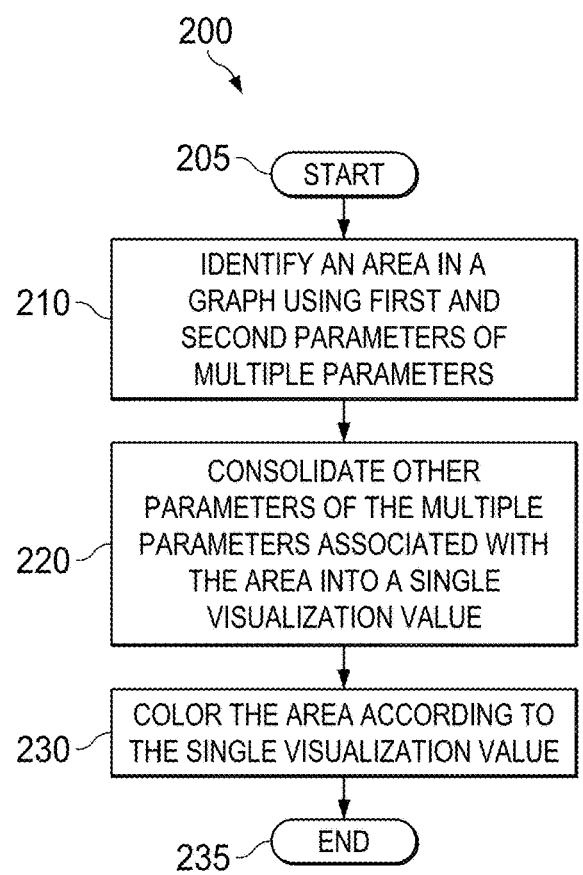
FIG. 2 illustrates a block diagram of an embodiment of a method of displaying multiple parameters of a well in a graph

In one embodiment, the memory 110 is further configured to store program instructions that, when executed by the processor 120, cause the computer 105 to carry out the required steps to plot multiple parameters of a well in a graph, such as the steps discussed in FIG. 2. The memory 110 may take the form of random access memory (RAM) or read-only memory (ROM). In one embodiment, the memory 110 is a secondary storage. The secondary storage includes, for example, a hard disk drive and/or a removable storage drive, representing a floppy disk drive, a magnetic tape drive, a compact disk drive, etc. The removable storage drive reads from and/or writes to a removable storage unit in a well-known manner.

In the illustrated embodiment, the processor 120 is configured to identify an area in the graph using first and second parameters of the multiple parameters. In one embodiment, the area is identified by mapping the first and second parameters to X and Y axes of the graph. The first and second parameters may correspond to the depth of the well and the time when the output composition of the well is measured.

In one embodiment, in addition to the first two parameters, a third parameter of the multiple parameters may be used to identify the area in the graph. In such an embodiment, the third parameter may be mapped to the Z axis of the graph.

In the illustrated embodiment, the processor 120 is further configured to consolidate other parameters (different from the first, second and third parameters) that are associated with the identified area in the graph into a single visualization value. For example, the output composition ratios of water, oil and gas associated with the well at the depth and the time corresponding to the first and second parameters would be consolidated. In one embodiment, the consolidated parameters may include the fourth parameter, such as the temperature of the well. It is understood that the maximum number of the consolidated parameters are not limited to four and may be more.

In the illustrated embodiment, the processor 120 is configured to consolidate the other parameters into the single visualization value by employing a color value algorithm (CVA). The CVA uses the other parameters as inputs and determines the single visualization value that is multidimensional such that it represents all the consolidated parameters. The single visualization value may be realized using color appearance properties such as hue, saturation, lightness, and brightness.

In the illustrated embodiment, the display 130 is configured to display the identified area according to the single visualization value. It is understood that in addition to the identified area, other areas in the graphs may be identified and displayed using other sets of the parameters.

FIG. 2 is a block diagram of one embodiment of a method 200 of displaying multiple parameters of a well in a graph. The method 200 may be carried out by a processor of a computing system such as the computing system 100 of FIG. 1. In such an embodiment, the instructions that cause the processor to perform the steps of the method 200 may be stored in a non-transitory medium, such as the memory 110 of the computing system 100 in FIG. 1. The method 200 starts at start step 205.

In step 210, an area in the graph is identified using first and second parameters of the multiple parameters of the well. In one embodiment, the area is identified by mapping the first and second parameters to X and Y axes of the graph. The first and second parameters may correspond to the depth of the well and the time when an output composition of the well is measured.

In one embodiment, a third parameter of the multiple parameters may also be used to identify the area. The third parameter may be, for example, temperature, acoustic intensity, stress/strain, fluid composition, pressure, pH level, chemical composition, or radioactivity level. In such an embodiment, the third parameter is mapped to the Z axis of the graph.

In step 220, other parameters (different from the first and second parameters) of the multiple parameters, which are associated with the identified area, are consolidated into a single visualization value. For example, the output composition ratios of water, oil and gas of the well at the depth and the time corresponding to the first and second parameters would be consolidated. In one embodiment, the consolidated parameters may include the fourth parameter, such as the temperature of the well. It is understood that the maximum number of the consolidated parameters are not limited to four and may be more.

In the illustrated embodiment, the other parameters are consolidated into the single visualization value by using a color value algorithm (CVA). The CVA uses the other parameters as inputs and determines the single visualization value that is multidimensional such that it represents all the consolidated parameters. The single visualization value may use multiple color appearance properties such as hue, saturation, lightness, and brightness to represent the multidimensional nature of the single visualization value. The step 220 is described in more details below with FIG. 3.

In step 230, the identified area is visualized and displayed according to the single visualization value. The method ends in step 235.

Figure 3:
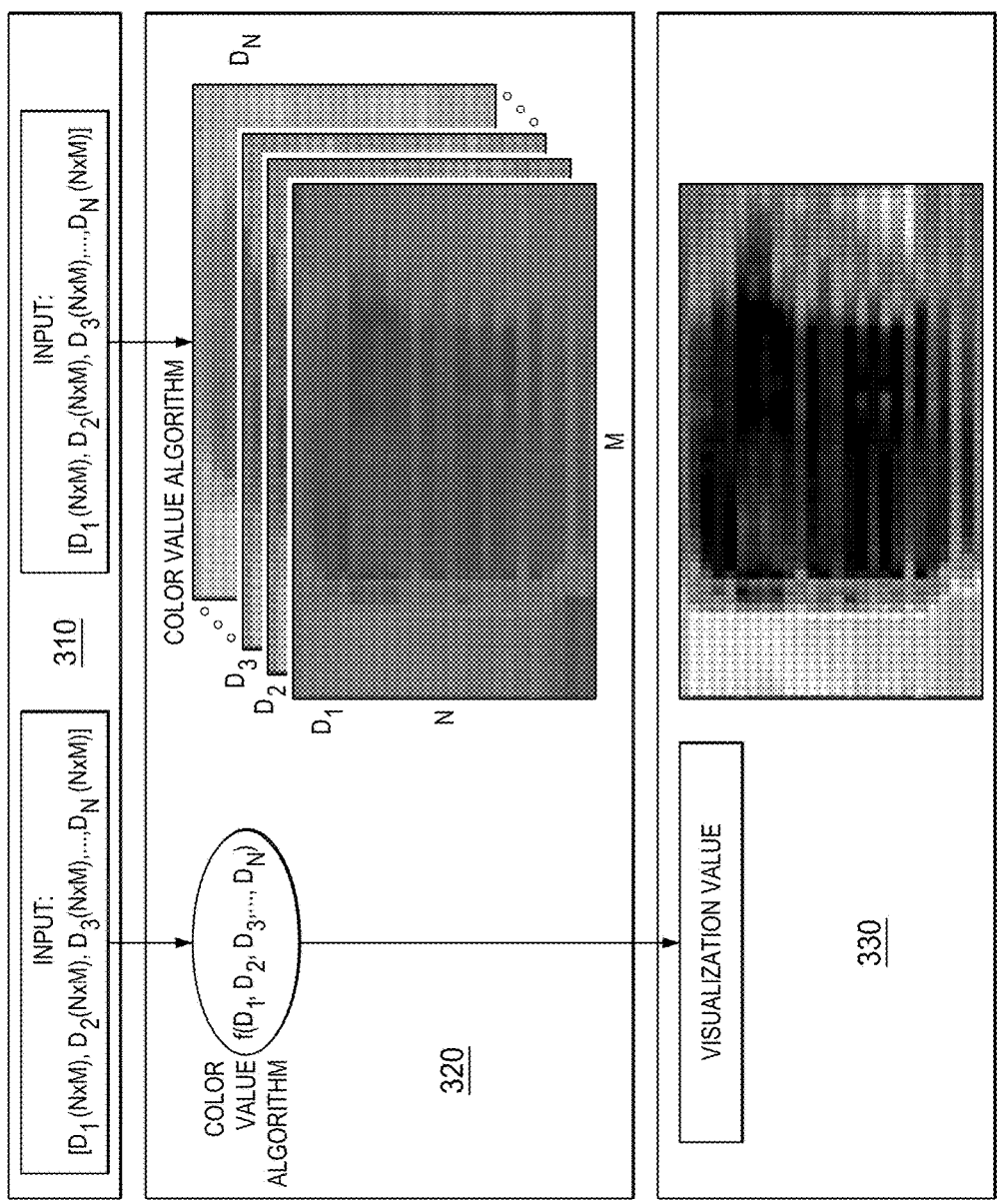
FIG. 3 illustrates an embodiment of a flow chart for using Color Value Algorithm (CVA) to consolidate multiple parameters into a single visualization value.

FIG. 3 is one embodiment of a flow chart 300 for using Color Value Algorithm (CVA) to consolidate multiple parameters into a single visualization value, e.g. the step 220 of the method 200 in FIG. 2. Each step of the chart 300 is described in two columns, the right column being a graphical representation of the left. As described above, the parameters being consolidated are parameters of a producing well such as output composition ratios of a well.

At step 310, N number of inputs, $D_1$-$D_N$, are provided to the CVA. Each input represents a set of values for each parameter. In the illustrated embodiment, each input has a same number of values, N×M, that are correlated to one another. The values are correlated using their respective locations in the graph.

At step 320, the CVA takes the inputs as variables of a function. As shown on the right, each of the inputs is represented as an N×M sized graph. As mentioned above, the CVA may attribute multiple color appearance properties to the inputs so that the resulting single visualization value may retain the multidimensional nature of the consolidated parameters.

At step 330, the single visualization value is obtained for each area of the graph. As shown on the right, when multiples of the single visualization values are displayed together, it presents a graph that can be more easily analyzed than those presented by the parametric rendering visualization software.

Figure 4:
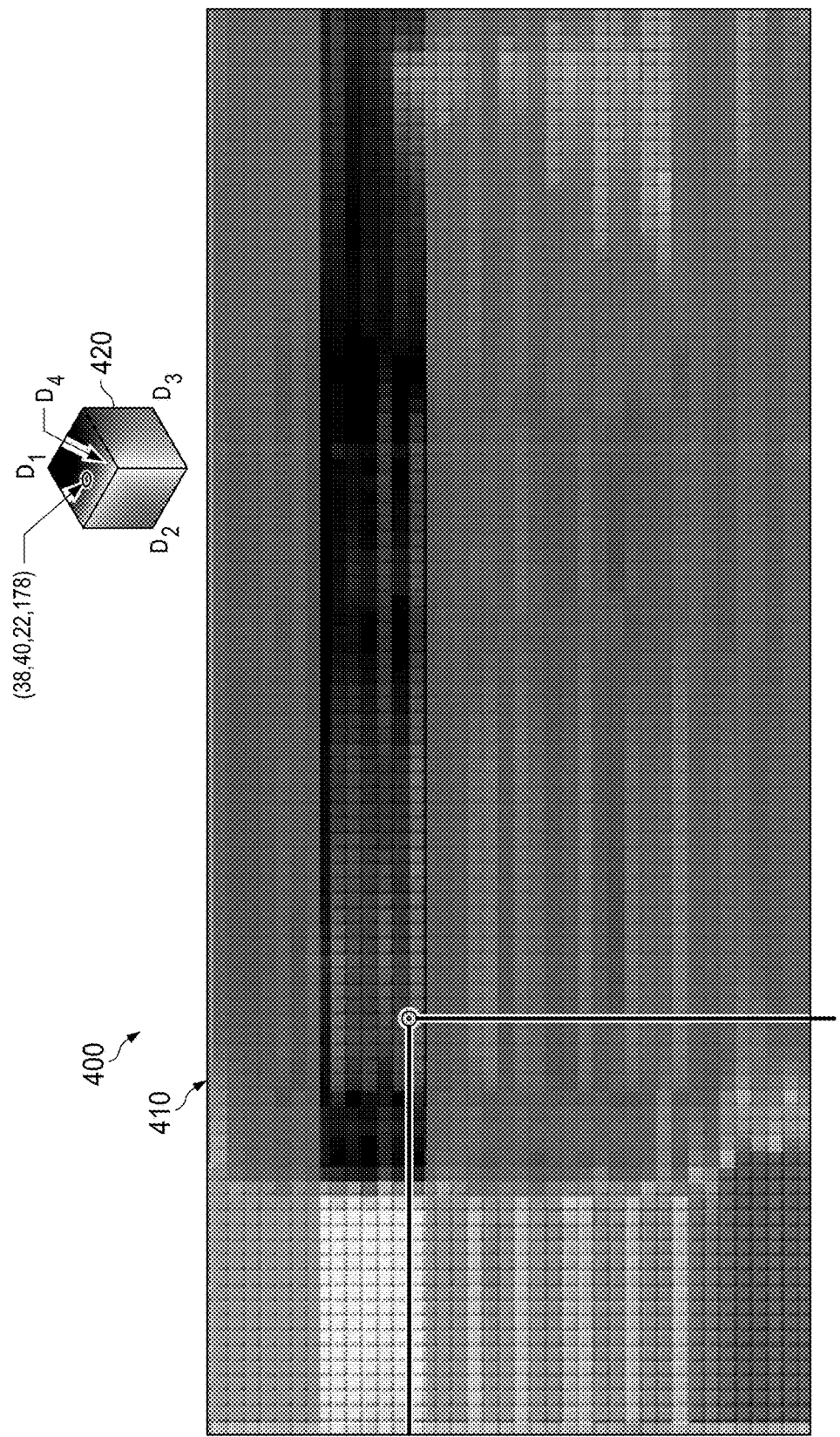
FIG. 4 illustrates an example of a simulated output of CVA for consolidating four inputs.

As FIG. 3 is in black and white drawings, the inputs and the output in the steps 320 and 330 are illustrated as if they are in grayscale. But when the inputs and outputs are displayed on a screen, such as a screen of the display 130 in FIG. 1, they are displayed according their attributed multiple color appearance properties, e.g. hues, lightness and/or brightness FIG. 4 is an example of a simulated output 410 of Color Value Algorithm (CVA) for consolidating four (4) inputs, D1, D2, D3, and D4. Each input is attributed with different values of hues, lightness and brightness as shown in the attribution legend 420. In the illustrated output 410, the single visualization value for a particular input set having values of 36, 40, 22, and 178 is displayed as a violet color of medium lightness and brightness.

As FIG. 4 is in black and white drawings, the inputs in the legend 420 and the output 410 are illustrated as if they are in grayscale. But when the inputs and outputs are displayed on a screen, such as a screen of the display 130 in FIG. 1, they are displayed according their attributed multiple color appearance properties, e.g. hues, lightness and/or brightness While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

As described above, the above-described systems and methods or at least a portion thereof may be embodied in or performed by various processors, such as digital data processors or computers, wherein the computers are programmed or store executable programs or sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods or functions of the system described herein.

As described above, certain embodiments disclosed herein may further relate to computer storage products with a non-transitory computer-readable medium that have program code thereon for performing various computer-implemented operations that embody at least part of the apparatuses, the systems or carry out or direct at least some of the steps of the methods set forth herein. Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. A computer-implemented method of displaying multiple parameters of a well in a graph, comprising:
   identifying an area in said graph using first and second parameters of said multiple parameters;
   consolidating, by a processor, other parameters of said multiple parameters that are associated with said area into a single visualization value, wherein said consolidating includes determining said single visualization value by employing a color value algorithm (CVA) that uses said other parameters as inputs; and
   visualizing said area in a display according to said single visualization value.

2. The method of claim 1, wherein said other parameters include ratios of oil, water and gas in an output composition of said well.

3. The method of claim 1, wherein said single visualization value has properties selected from the group consisting of hue, saturation, lightness, brightness, and transparency.

4. The method of claim 1, wherein said using said first and second parameters of said multiple parameters includes mapping said first and second parameters to x and y axes of said graph.

5. The method of claim 1, wherein said first and second parameter correspond to a depth of said well from sea level and a time when an output composition of said well is measured.

6. A non-transient computer readable medium containing program instructions that, when executed by a computer, cause the computer to display multiple parameters in a graph by carrying out the steps of:
   identifying an area in a graph using first and second parameters of said multiple parameters;
   consolidating other parameters of said multiple parameters that are associated with said area into a single visualization value, wherein said consolidating includes determining said single visualization value by employing a color value algorithm (CVA) that uses said other parameters as inputs; and
   visualizing said area in a display according to said single visualization value.

7. The computer readable medium of claim 6, wherein said multiple parameters are parameters of a well.

8. The computer readable medium of claim 6, wherein said other parameters includes four parameters.

9. The computer readable medium of claim 6, wherein said single visualization value has properties selected from the group consisting of hue, saturation, lightness, and brightness.

10. The computer readable medium of claim 6, wherein said using said first and second parameters of said multiple parameters includes mapping said first and second parameters to x and y axes of said graph.

11. The computer readable medium of claim 7, wherein said first and second parameter correspond to a depth of said well from sea level and a time when an output composition of said well is measured, and said other parameters include ratios of oil, water and gas in said a output composition of said well.

12. A computing system for plotting multiple parameters of a well in a graph, comprising:
   a memory configured to store said multiple parameters;
   a processor configured to:
      identify an area in said graph using first and second parameters of said multiple parameters; and
      consolidate other parameters of said multiple parameters that are associated with said area into a single visualization value employing a color value algorithm (CVA) that uses said other parameters as inputs, and
   a display configured to display said area according to said single visualization value.

13. The system of claim 12, wherein said other parameters include ratios of oil, water and gas in an output composition of said well.

14. The system of claim 12, wherein said single visualization value has properties selected from the group consisting of hue, saturation, lightness, and brightness.

15. The system of claim 12, wherein said processor is configured to identify said area by mapping said first and second parameters to x and y axes of said graph.

16. The system of claim 12, wherein said first and second parameter correspond to a depth of said well from sea level and a time when an output composition of said well is measured.

* * * * *